US006367687B1

United States Patent
Reeves et al.

(10) Patent No.: US 6,367,687 B1
(45) Date of Patent: Apr. 9, 2002

(54) METHOD FOR PREPARING A PLATE RIM FOR BRAZING

(75) Inventors: Jim Dean Reeves, Cincinnati, OH (US); Gary Eugene Wheat, Madisonville, KY (US); Nicholas Charles Palmer, Loveland, OH (US); Robert Eugene McCracken, Madisonville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/836,038

(22) Filed: Apr. 17, 2001

(51) Int. Cl.⁷ .......................... B23K 31/02; B23K 35/38
(52) U.S. Cl. ........................................ 228/206; 228/220
(58) Field of Search ................................. 228/119, 203, 228/205, 206, 207, 219, 220; 29/889.1–889.722

(56) References Cited

U.S. PATENT DOCUMENTS

| | | |
|---|---|---|
| 4,098,450 A | 7/1978 | Keller et al. ................. 228/119 |
| 4,169,020 A | 9/1979 | Stalker et al. ................. 204/16 |
| 4,188,237 A | 2/1980 | Chasteen ....................... 134/2 |
| 4,214,355 A | 7/1980 | Zelahy ........................ 29/156.8 |
| 4,227,703 A | 10/1980 | Stalker et al. ................. 277/53 |
| 4,405,379 A | 9/1983 | Chasteen ....................... 134/2 |
| 5,672,261 A | 9/1997 | Wheat et al. ................. 205/206 |
| 5,728,227 A | 3/1998 | Reverman ....................... 134/2 |
| 5,898,994 A | * 5/1999 | Miller et al. |

* cited by examiner

Primary Examiner—Tom Dunn
Assistant Examiner—Kiley Stoner
(74) Attorney, Agent, or Firm—Andrew C. Hess; David L. Narciso

(57) ABSTRACT

A method is provided for treating cooperating, juxtaposed substantially uncoated alloy substrate surfaces in preparation for brazing, for example an inner wall of the radially outer open end of a turbine engine blading member with the rim of an end plate or tip cap. The method includes treating at least one of the cooperating surfaces with a reducing gas comprising halogen gas for a time and at a temperature, for example 1–6 hours at 1650–1950° F., sufficient to remove any surface debris, for example oxides, and to deplete the alloy substrate surface of the total of elements selected from Al and Ti to a level of less than about 1 weight %. Depletion is to a depth in the surface which avoids intergranular attack of the substrate alloy surface. For example, the depth is no greater than about 0.0015". Then the cooperating surfaces are brazed together.

5 Claims, 1 Drawing Sheet

METHOD FOR PREPARING A PLATE RIM FOR BRAZING

BACKGROUND OF THE INVENTION

This invention relates to preparing a plate rim for joining with a wall of an abutting member. More particularly, it relates to preparation for brazing of an outer rim of an end plate or tip cap to an inner wall of a hollow member, for example an inner wall of the tip portion of an air cooled turbomachinery blade.

During one form of the manufacture of a turbine engine high temperature operating, airfoil shaped, generally hollow air-cooled turbine blading member such as a blade or vane, an end plate is bonded at the radially outer portion of the member. Such an end plate, generally referred to in the turbine engine art as a tip cap, has been described in a variety of forms. Typical U.S. Patents discussing some of such forms include U.S. Pat. No. 4,169,020—Stalker et al. (patented Sep. 25, 1979); U.S. Pat. No. 4,214,355—Zelahy (patented Jul. 29, 1980); and U.S. Pat. No. 5,672,261—Wheat et al. (patented Sep. 30, 1997). Of more particular interest in connection with an embodiment of the present invention is the Wheat et al. patent. That patent describes electrochemical removal of material from the inner wall of the member and cleaning products of casting at least from the plate rim such as by at least one of chemical (acid) treatment and a mechanical abrasion type of method, typically tumbling in a abrasive medium. Then a Ni electroplate was provided on the rim to enhance bonding, for example brazing, between the plate rim and an inner wall of a member.

A form of such tip caps described by Wheat et al. is manufactured by typical, well known ceramic mold precision casting of a Ni base superalloy, for example from commercially available Rene' 80 alloy, forms of which are more fully described in U.S. Pat. No. 3,615,376—Ross (patented Oct. 26, 1971). A form of Rene' 80 Ni base superalloy generally includes nominally by weight about 9.5% Co, 3% Al, 14% Cr, 5% Ti, 4% W, 4% Mo, 0.17% C, 0.015% B, 0.03% Zr, with the balance Ni and incidental impurities. The as-cast tip cap generally includes on its surface portion oxides, as the product of precision casting ceramics and oxidation of the tip cap alloy surface, as well as the alloy elements themselves, including particularly Al and Ti. All of such products and elements can inhibit the surface wetting of a typical brazing alloy, if one subsequently is used to bond a surface of the tip cap to an airfoil wall.

The method described by the Wheat et al. patent represents one approach to enhancing brazing of the plate rim to an inner wall of a member using such cleaning and a Ni intermediate portion. However, it has been recognized that such a multiplicity of preparation steps and difficulties observed in providing an adequate Ni electroplate on the tip cap rim decreased manufacturing yield and quality, and therefore increased manufacturing cost.

BRIEF SUMMARY OF THE INVENTION

The present invention, in one form, provides, in a method for making an article such as a turbomachinery blading member, the preparation for brazing together first and second substantially uncoated substrate surfaces, for example an end plate rim and an inner surface of a wall of a hollow body open end. The method eliminates use of Ni, for example Ni electroplate, as an intermediate material to enhance wetting by the braze alloy of at least one substrate surface, for example the end plate rim. The substrate alloy surfaces are made of an alloy based on at least one of Fe, Co, and Ni including greater than about 5 weight % total of Al and Ti. The method comprises preparing at least one of the surfaces, for example the end plate rim, by treating the surface with a reducing gas comprising a halogen gas, for example about 3–20 volume % of halogen gas. Treatment is at a temperature and for a time, for example for about 1–6 hours at about 1650–1950° F., sufficient for the gas to react with Al and/or Ti in the alloy surface to a depth that avoids intergranular attack (IGA) of the substrate alloy surface, preferably to a depth no greater than about 0.0015". This converts such elements only in the surface to such depth to a gaseous halide form and depletes such elements to a total level below about 1 wt %. Then the surface or surfaces thus prepared is brazed with an inner surface of the wall.

DETAILED DESCRIPTION OF THE INVENTION

Ni base superalloys developed for use in hot operating sections of a turbine engine, for example downstream of the combustion section of a modem gas turbine engine, include relatively large amounts of alloying elements to provide an appropriate combination of mechanical properties and some resistance to hot environmental deterioration. Such elements include combinations selected from Al, Ti, Cr, Mo, W, Ta, Cb, etc. well known and widely reported in the gas turbine engine art. Frequently it is desired, in the manufacture from such an alloy of a complex aircooled article, for example an air-cooled turbine blade, to join together a plurality of members, for example by brazing. However, the existence of certain of such elements in the outer surface to be joined can interfere with efficient bonding of the members, for example wetting by a brazing alloy of surfaces to be brazed. Such interference can result from formation, during a brazing cycle, of outer surface oxides of such elements.

Figure 1:
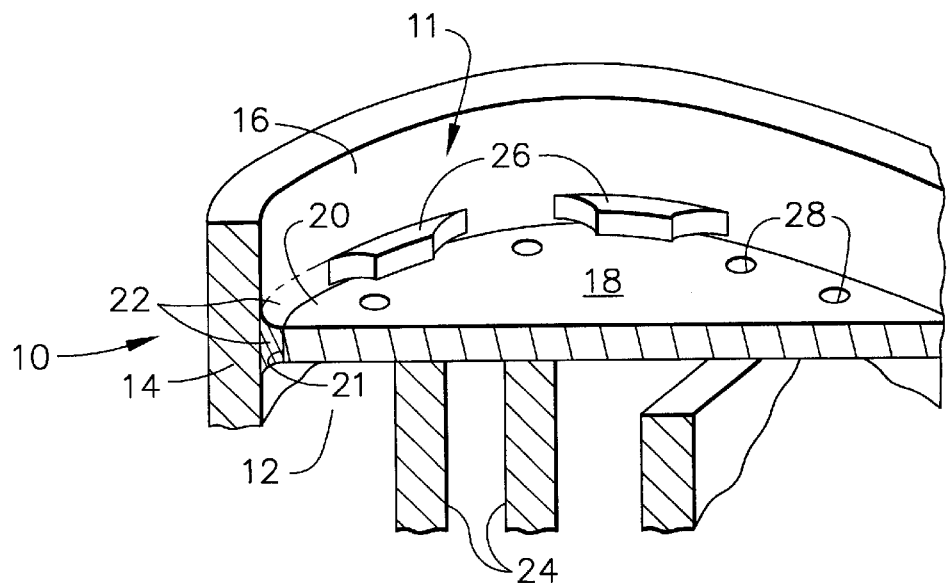
FIG. 1 is a diagrammatic, fragmentary, partially sectional view of an open radially outer end of a hollow air-cooled turbine blade with an end plate rim as a tip cap brazed to an inner surface of the blade wall.

A typical example of such a complex gas turbine engine article is a generally hollow, air-cooled gas turbine engine turbine blade generally described in the above-identified Zelahy patent and in such U.S. Patents as U.S. Pat. No. 5,458,461—Lee et al. (patented Oct. 17, 1995). FIG. 1 of this description is a diagrammatic, fragmentary, partially sectional view of one embodiment of a radially outer end or tip portion, shown generally at 10, of such a hollow, air-cooled gas turbine engine turbine blade or body, including an open end shown generally at 11. The body of the blade has a hollow interior 12 enclosed by outer wall 14 having an inner wall surface 16 which defines at least a portion of the open end 11. An end plate 18, sometimes called a tip cap, includes a plate rim portion 20 having a plate rim surface 21, shown more clearly in FIG. 2. The plate rim portion 20 is shaped so that at least a portion of plate rim surface 21 matches with at least a portion of the inner wall surface 16 when juxtaposed therewith. In one embodiment after manufacture, end plate 18 is disposed within the open blade end or tip 11 and brazed at brazed joint 22 to inner wall surface 16. In the embodiment of FIG. 1, end plate 18 is positioned by resting on internal walls 24, which define a portion of a complex labyrinthine internal structure for air-cooling of hollow interior 12. Assisting in the positioning of end plate 18 within the blade open end 11, in the embodiment of FIG. 1, are positioning members 26 projecting from inner wall surface 16. Frequently, such an end plate or tip cap as 18 includes cooling air discharge openings 28, for example as shown in the above-identified Zelahy and Lee et al. patents.

Figure 2:
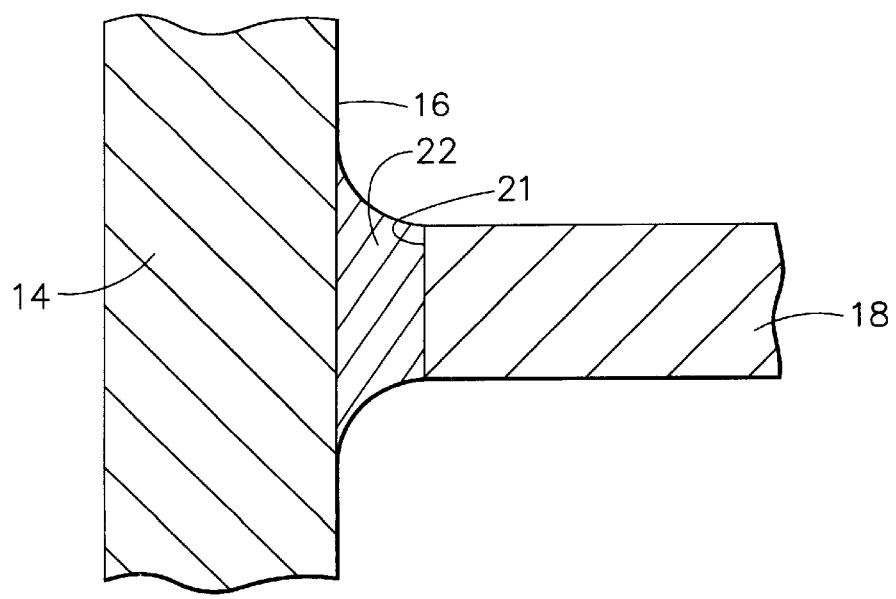
FIG. 2 is an enlarged fragmentary sectional view of a portion of FIG. 1 about the brazed joint.

FIG. 2 is an enlarged, sectional fragmentary diagrammatic view of a portion of FIG. 1 about brazed joint 22. Shown more clearly in FIG. 2 is plate rim surface 21 which is prepared for brazing according to a form of the present invention.

As was described in the above-discussed Wheat et al. patent, members to be brazed were prepared by cleaning wall inner surface 16 by electrochemical material removal in combination with applying and diffusing Ni on and into the cooperating plate rim surface 21. Application of Ni, for example conveniently by electrodeposition, has been difficult and has resulted in a less than desirable production yield.

However, it was recognized, according to a form of the present invention, that a good brazed joint can be obtained between such members by a less complex method. Such method, according to the present invention, results in a very high production yield by concurrently cleaning at least the plate rim of residual oxide type products from manufacture of the end plate and removing the potential for outer surface oxide formation during the brazing cycle. This is accomplished by depleting Al and/or Ti from the outer portion of the plate rim surface 21 without causing IGA of the substrate alloy. Depletion of such elements, preferably to a depth of no greater than about 0.0015" to avoid IGA of the substrate alloy, is conducted at the outer surface so that the total amount of Al and/or Ti is no greater than about 1 wt. %. According to a form of the present invention, concurrent removal of surface contamination such as oxides and depletion to such depth of such elements is accomplished by controlling exposure of at least the plate rim surface to a reducing gas comprising a halogen gas. For example, exposure was to a gaseous mixture of about 3–20 volume % of a hydrohalogen gas, for example HF gas, with the balance hydrogen gas. The reducing gas and exposure is controlled for a time and at a temperature sufficient to remove any surface debris and oxides, and concurrently deplete Al and/or Ti at least from the rim surface to a depth that avoids IGA of the substrate alloy, preferably to a depth of no greater than about 0.0015".

Use of halogen ions, for example fluoride ions, has been reported for use in removing surface contaminants such as metal oxides in preparation for subsequent repair. Keller et al. in U.S. Pat. No. 4,098,450 (patented Jul. 4, 1978) remove oxides of Al or Ti or both by exposing a damaged surface to fluoride ions. Then a repair brazing alloy was used at the cleaned portion. Similar use of gaseous fluorides was reported by Chasteen in U.S. Pat. Nos. 4,188,237 and 4,405,379. In U.S. Pat. No. 5,728,227 (patented Mar. 17, 1998), Reverman describes depleting Al from an inner portion of a diffused coating inner portion by exposing the coating inner portion and subjecting the exposed coating inner portion to a reducing halogen gas to deplete Al from the coating inner portion. In one form, Reverman uses a mixture comprising hydrohalogen gas and hydrogen gas.

Embodiments of the present invention also use such reducing mixture of gases but controlled in amount and exposure conditions for a different kind of purpose not suggested by the prior art. Forms of the present invention comprise preparation of an alloy substrate surface for braze bonding by the combination of removal from or cleaning of an uncoated, newly manufactured, alloy substrate surface of surface debris, including oxides for example residual from manufacturing, and the depletion from within the substrate surface of Al and/or Ti to remove the potential for oxide formation of such elements during brazing. Practice of such forms of the present invention has resulted in a substantially 100% yield in evaluations of the present invention. However, exposure to the reducing mixture of gases was controlled to avoid IGA of the substrate alloy. Such control is not required for depletion of Al and/or Ti from a coating surface.

In one evaluation, 10 newly manufactured high pressure gas turbine engine turbine blade bodies of the above described Rene' 80 Ni base superalloy were selected for evaluation. Some other evaluations of the present invention resulted in good brazed joints without prior body wall cleaning. However, to assure removal of oxide debris from the inner wall surface of the blade body outer open end to more clearly isolate evaluation of the present invention, the body wall was cleaned by electrochemically removing the debris using an aqueous solution of sulfuric acid. Newly manufactured end plates or tip caps of Rene' 80 Ni base superalloy were selected to be brazed at such inner wall of the blade body radially outer plenum in the form shown in the drawings. The tip caps, as manufactured by precision casting, included on their surfaces, including their rims, debris from manufacturing, including surface oxides. Because the tip caps were made of Rene' 80 Ni base superalloy, the total content of Al and Ti in such substrate alloy was about 8 wt. %. However it was recognized that the presence of such surface debris and a total of greater than about 5 wt % of such elements inhibited wetting of the tip cap rim a surface by a typical high temperature brazing alloy used in the art for such purpose because of the formation, during the brazing cycle, of oxides of Al and Ti.

The surface debris, including surface oxides, was removed and the substrate surface concurrently was depleted of Al and Ti to a depth that avoided IGA of the substrate alloy, in this evaluation to a depth of no greater than about 0.0015" for Rene' 80 Ni base superalloy, typically about 0.0002". This was accomplished by treating the tip caps, including the rims, with a reducing mixture of gases comprising about 3–12 volume % hydrogen fluoride gas, with the balance principally hydrogen gas. This mixture was within a preferred range of about 3–20 volume % hydrohalogen gas with the balance principally hydrogen gas. This range was maintained and controlled to effectively deplete Al and/or Ti, while avoiding IGA or undesirable substrate alloy depletion, to a depth no greater than about 0.0015". Such treatment was conducted at a temperature in the range of at least 1600° F., preferably 1650–1950° F., for at least 2 hours. In this particular evaluation, the time nominally was 4 hours, in the preferred range of about 2–4 hours, nominally at 1925° F., within the preferred range of about 1800–1925° F. Microprobe analysis of the treated tip cap surface showed the sum of Al and Ti was less than 1 wt. % at a distance of 5 microns from the surface.

After treatment with the reducing mixture, the tip caps rims were brazed to the inner wall of the blade body, as shown in the drawing, using a commercially available brazing alloy, similar in composition to the Rene' 80 Ni base superalloy. Such brazing alloy had a nominal composition, by weight, of 14% Cr, 9.5% Co, 4.9% Ti, 4% W, 4% Mo, 3% Al, 0.7% B, 4.5% Si, with the balance essentially Ni.

Examination of the brazed tip caps showed complete wetting of the brazing alloy on the plate rim, no IGA of the substrate alloy, and a 100% yield of adequately brazed tip caps.

In another evaluation of the present invention repeating the above discussed evaluation, another series of 90 newly manufactured Rene' 80 Ni base blade bodies and tip caps were treated and brazed as above. Again, complete wetting of the tip cap rim by the braze alloy resulted with no IGA of the substrate alloy, providing a 100% yield of adequately brazed tip caps to the inner wall of the blade body radially outer plenum, as shown in the drawing.

The present invention has been described in connection with specific examples, combinations, structures, alloys, etc. However, it should be understood that they are intended to be typical of rather than in any way limiting on the scope of the present invention. Those skilled in the art will understand that the invention is capable of variations and modifications without departing from the scope of the appended claims.

What is claimed is:

1. In a method for making an article comprising a body including a brazed joint between juxtaposed cooperating first and second substantially uncoated substrate alloy surfaces of an alloy based on at least one element selected from the group consisting of Fe, Co, and Ni, at least one of the cooperating alloy surfaces including greater than about 5 weight % total of elements selected from the group consisting of Al and Ti, the steps of:

preparing at least one of the cooperating surfaces for brazing by treating the surface with a reducing gas comprising halogen gas at a temperature and for a time sufficient to convert the selected elements to a depth in the surface to a gaseous halide form and to deplete the selected elements to less than about 1 weight % while avoiding intergranular attack of the substrate alloy surface by the reducing gas; and then, brazing together the first and second substrate alloy surfaces.

2. The method of claim 1 in which the depth is no greater than about 0.0015".

3. The method of claim 2 in which:

the alloy of the substrate alloy surface is a Ni base superalloy;

the reducing gas is a mixture of about 3–20 volume % of a hydrohalogen gas with a balance principally of hydrogen gas;

the time is in the range of about 1–6 hours; and, the temperature is in the range of about 1650–1950° F.

4. The method of claim 3 in which:

the reducing gas is a mixture of about 3–12 volume % of hydrogen fluoride gas with a balance principally of hydrogen gas;

the time is in the range of about 2–4 hours; and, the temperature is in the range of about 1800–19250° F.

5. The method of claim 3 in which:

the article is a blading member of a turbine engine;

the first of the substantially uncoated alloy substrate surface is an inner wall of a radially outer open portion of the blading member, and the second of the substantially uncoated alloy substrate surface is a rim of an end plate disposed in juxtaposition and cooperating for brazing with the inner wall;

the reducing mixture of gases is a mixture of hydrogen fluoride gas and hydrogen gas; and, the treatment is conducted at a temperature in the range of about 1800–1925° F. for a time in the range of about 2–4 hours.

* * * * *